United States Patent
Tho (10) Patent No.: US 8,714,328 B2
(45) Date of Patent: May 6, 2014

(54) HUB ASSEMBLY WITH THE RATCHET MEMBER MOVABLE IN TWO DIRECTIONS

(75) Inventor: Kee Ping Tho, Jiangsu (CN)

(73) Assignee: Kunshan Henry Metal Technology Co., Ltd., Jiangsu (CN)

( * ) Notice: Subject to any disclaimer, the term of this patent is extended or adjusted under 35 U.S.C. 154(b) by 16 days.

(21) Appl. No.: 13/271,610

(22) Filed: Oct. 12, 2011

(65) Prior Publication Data

US 2013/0092495 A1  Apr. 18, 2013

(51) Int. Cl.
 *F16D 41/32* (2006.01)
(52) U.S. Cl.
 USPC .............. 192/64; 192/105; 192/46; 192/84.3
(58) Field of Classification Search
 USPC .................................. 192/64, 108
 See application file for complete search history.

(56) References Cited

U.S. PATENT DOCUMENTS

| | | | | |
|---|---|---|---|---|
| 3,666,064 A | * | 5/1972 | Bird et al. | 192/84.3 |
| 4,593,799 A | * | 6/1986 | Ozaki | 192/46 |
| 6,478,128 B2 | * | 11/2002 | Taylor | 192/64 |
| 6,523,993 B2 | * | 2/2003 | Williams et al. | 366/197 |
| 2009/0255774 A1 | * | 10/2009 | Hsu | 192/64 |

* cited by examiner

*Primary Examiner* — David D Le
*Assistant Examiner* — Mark Manley
(74) *Attorney, Agent, or Firm* — Rosenberg, Klein & Lee (57) ABSTRACT

A hub assembly includes a ratchet mechanism located between the hub and the tubular portion on one end of the hub, and including a driving member which is located in the tubular portion and is movable linearly. One side of the driving member has a cone-shaped first ratchet portion located axially and is composed of two triangular contact surfaces. A passive member is movable in the first slot and one side of the passive member has a cone-shaped second ratchet portion which is engaged with the first ratchet portion. A returning member unit is located between the hub and the passive member, and between the tubular portion and the driving member. By the triangular cone-shaped first and second ratchet portions, the contact area and the friction between the ratchet portions are reduced, and the engagement and disengagement is more quick and smooth.

7 Claims, 9 Drawing Sheets

HUB ASSEMBLY WITH THE RATCHET MEMBER MOVABLE IN TWO DIRECTIONS

FIELD OF THE INVENTION

The present invention relates to a hub assembly, and more particularly, to a hub assembly with two ratchet members to be movable in two directions, and the engagement and disengagement between the ratchet members are more smooth and efficient.

BACKGROUND OF THE INVENTION

A conventional bicycle hub assembly generally includes a hub, an axle, a rotatable unit and a gear disk so as to position the axle and to allow the wheel to rotate. According to practical needs, a tubular portion and a derailleur device are equipped. The hub assembly can transmit torque in one direction or in two directions, the one-direction transmission means that the hub rotates in the forward direction to move the bicycle move forward, and the reverse direction cannot move the bicycle. The two-direction transmission means that the hub can transmit torque in both directions.

The ratchet mechanism for the one-direction transmission hub can be engaged in radial direction or in axial direction. The radial engagement means that the hub includes teeth in the radial direction and the teeth are engaged with radial ratchet blocks. The axial engagement means that the hub includes teeth in the axial direction and the teeth are engaged with axial ratchet blocks.

When in action, the one-direction transmission ratchet device generates a linear movement between the ratchet device and the hub so as to generate a gap to disengage the ratchet device and the hub. Therefore, the hub cannot transmit torque. The linear movement between the ratchet device and the hub can be two-side linear movement and single-side linear movement.

Taiwan Patent No. 088117780 discloses an axle, a hub co-axially connected with the axle, at last one bearing device which includes at least two bearings located between the hub and the axle, so that the hub is rotatable relative to the axle. A rotor is rotatable about the axle and has at least gear connected to the rotor. A free wheel which is located between the rotor and the hub, and has two plates and each plate has a toothed surface. The two toothed surfaces are pushes toward each other by a tension device. The two plates are co-axial with the axle and located on a plane that is perpendicular to the axis of the axle when the wheel is in stopped status. The plates are kept to be inclined relative to the plane perpendicular to the axis of the axle. The two plates are installed consecutively and a spring pushes the two plates toward each other.

Taiwan Utility Patent No. 096219278 discloses a collar made by metal and multiple teeth are defined in an inner periphery of the collar. The teeth extend axially. A ratchet block is made by magnetic material and includes two end surfaces. The shape of the ratchet block is axially and slidably engaged with the teeth of the collar. One end surface has an annular teeth and a fly wheel has another annular teeth which is engaged with the annular teeth of the end surface in one direction. A permanent magnet is connected to the other end surface that does not have the annular teeth.

The hub of the first example includes an annular threaded portion on the right end thereof and the annular threaded portion has teeth which are engaged with one of the plates in radial direction and can be moved linearly relative to the plate. The rotor has teeth which are engaged with the other plate in radial direction, so that linear movements can be made in two directions. The two respective facing surfaces of the two plates have teeth engaged with each other. The annular threaded portion, the two plates and the spring are cooperated to form a free wheel mechanism. The two plates can be moved linearly in two directions. When the pedals are treaded forward, the teeth between the two plates are pushed to each other to transmit torque. When the pedals are treaded backward, the teeth between the two plates slide over each other, and the sliding action is cooperated with the linear movement in two directions, the two plates are separated from each other so that the hub is rotated without torque being output.

The hub of the second example has annular ratchet teeth on the inside of the flywheel and the ratchet block has annular ratchet teeth facing the fly wheel so as to be engaged with the end of the fly wheel. The ratchet block is normally located in the collar by the permanent magnet. The ratchet block is moved linearly relative to the collar. The annular ratchet teeth on the other side of the fly wheel are fixed so as to form the linear movement in one direction between the ratchet block and the hub. This also achieves the purpose that the hub transmits torque in only one direction.

However, the teeth in the two examples are composed of an inclined surface and a vertical surface. Therefore, the teeth have a pre-set height and there is a difference in height between the next tooth. During the interactive linear movement between the plates or the ratchet blocks, the inclined surface is too large so that no gap is formed and this causes wearing by friction between the teeth. The friction generates resistance to slow down the linear movement. Besides, the difference of height between the vertical surfaces of the teeth affects the smooth actions between the ratchet teeth. The plates and the ratchet blocks cannot be quickly engaged again and the sensitivity of the transmission is reduced. Besides, there is a gap between the plates and the spring, between the ratchet block and the permanent magnet, and between the hub and the axle. The spring or the permanent magnet is simply mounted to the axle and the two ends of the spring or the permanent magnet are not well positioned so that the parts tend to be inclined or tilt when operation. This affects the transmission of the ratchet mechanism.

The present invention intends to provide a hub assembly to mitigate the shortcomings of the conventional hub assemblies.

SUMMARY OF THE INVENTION

The present invention relates to a hub assembly and comprises a hub having a first hole and a first slot is defined in the inner periphery of the first hole. The first slot is parallel to the axis of the hub and an axle is located in the first hole. A tubular portion has a second hole and a second slot is defined in the inner periphery of the second hole. The second slot is parallel to the axis of the tubular portion. A driving member is an annular member and has multiple first teeth defined in the outer periphery thereof. The first teeth are located corresponding to the second slot. The driving member has a cone-shaped first ratchet portion formed axially thereon which has two triangular contact surfaces to form a cone-shaped surface in radial direction. The two triangular contact surfaces have different areas. The first teeth are engaged with the second slot and the driving member is moved linearly in the second slot. A passive member is an annular member and has multiple second teeth defined in the outer periphery thereof. The second teeth are located corresponding to the first slot. The passive member has a cone-shaped second ratchet portion formed axially thereon. The second teeth of the passive member are engaged with the first slot and the passive member is moved linearly in the first slot. A returning member unit has two returning members which are respectively located between the hub and the passive member, and between the tubular portion and the driving member. By the triangular cone-shaped first and second ratchet portions, the contact surface and the friction between the ratchet portions are reduced, and the engagement and disengagement is more quick and smooth.

The primary object of the present invention is to provide a hub assembly, wherein two ratchet portions are engaged to each other and located between a driving member and a passive member. The teeth of each of the ratchet portions have two triangular contact surfaces in radial direction so as to reduce contact area and when the driving member and the passive member are moved linearly and disengaged from each other, a gap is defined between the teeth so that the operation between the two ratchet portions is more sensitive and quick.

Another object of the present invention is to provide a hub assembly, wherein a tube is connected between the hub, the driving member, the passive member and the tubular portion. The tube guides the linear movement between the driving member, the passive member and the returning members.

Yet another object of the present invention is to provide a hub assembly, wherein the driving member and the passive member each have a stop on one side thereof so as to fix the returning members and is convenient for assembling.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, the hub assembly of the present invention comprises a ratchet mechanism located between a hub 10 and a tubular portion 20, wherein the ratchet mechanism comprises a driving member 30 located in the tubular portion 20, a passive member 40 located in the hub 10 and a returning member unit.

Figure 1:
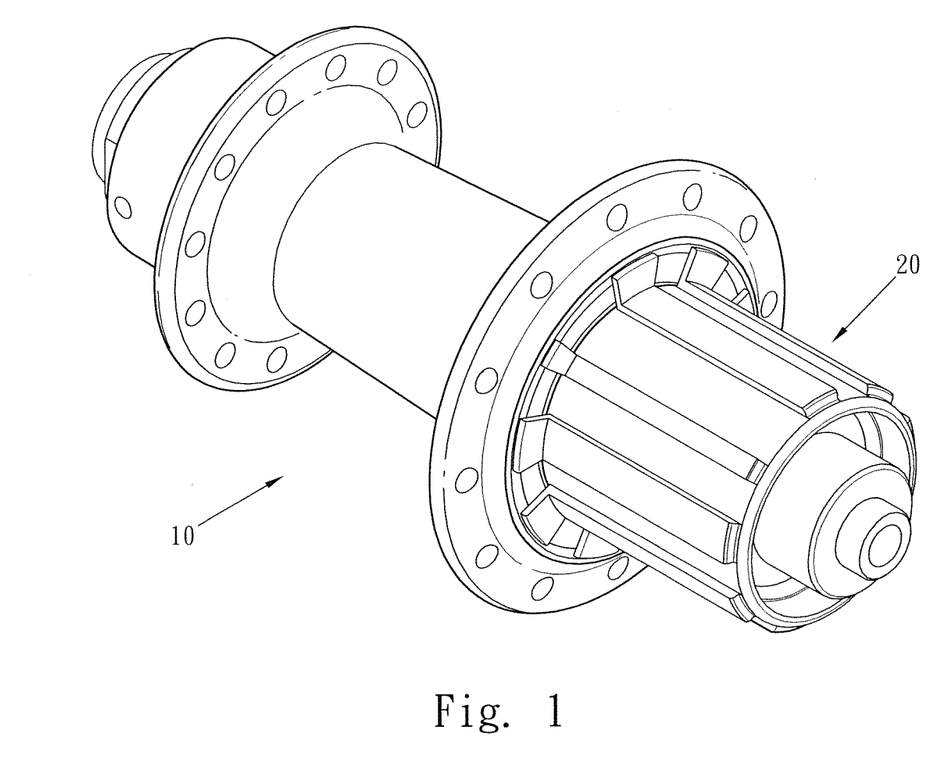
FIG. 1 is a perspective view to show the hub assembly of the present invention.
Figure 2:
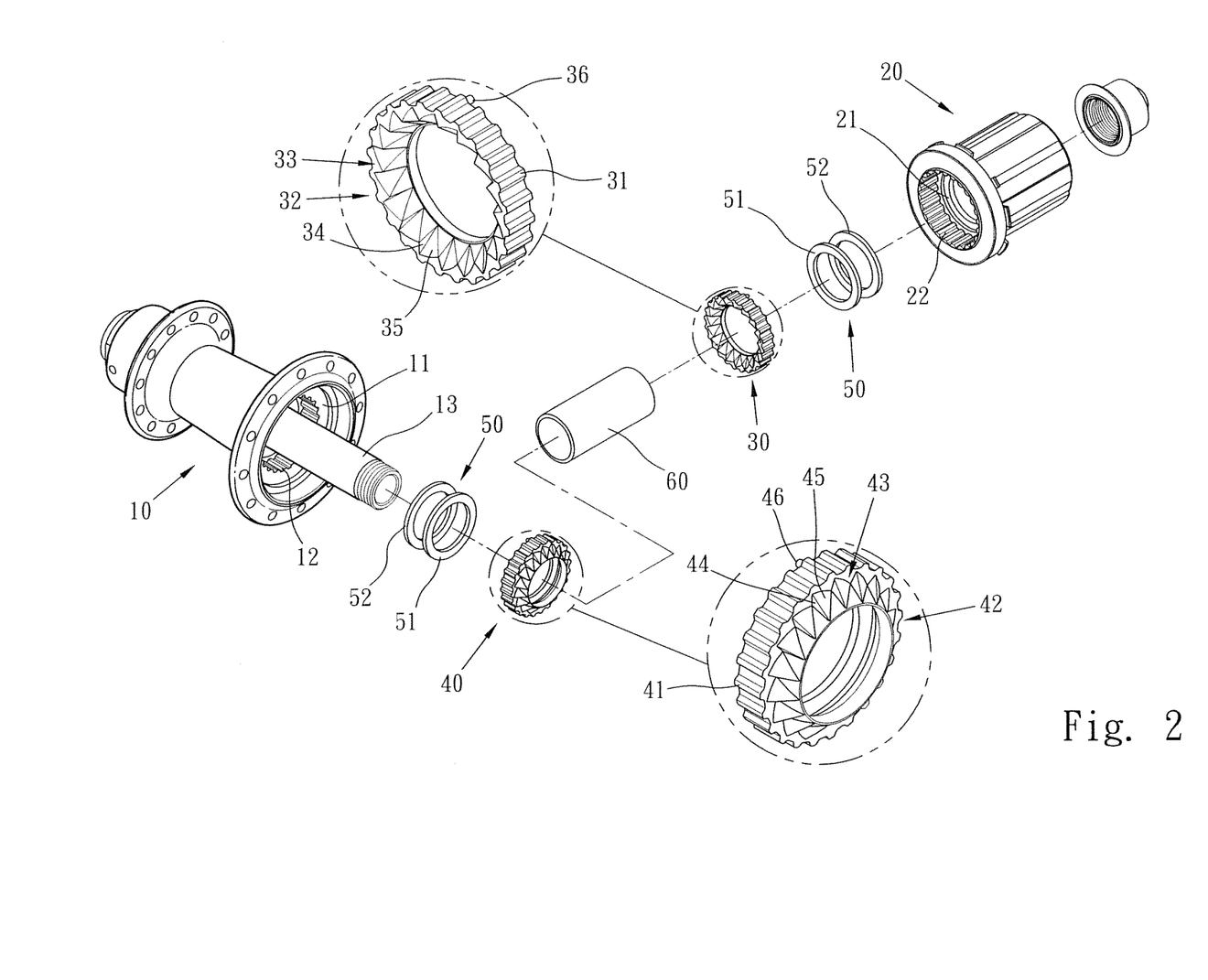
FIG. 2 is an exploded view to show the hub assembly of the present invention.
Figure 5:
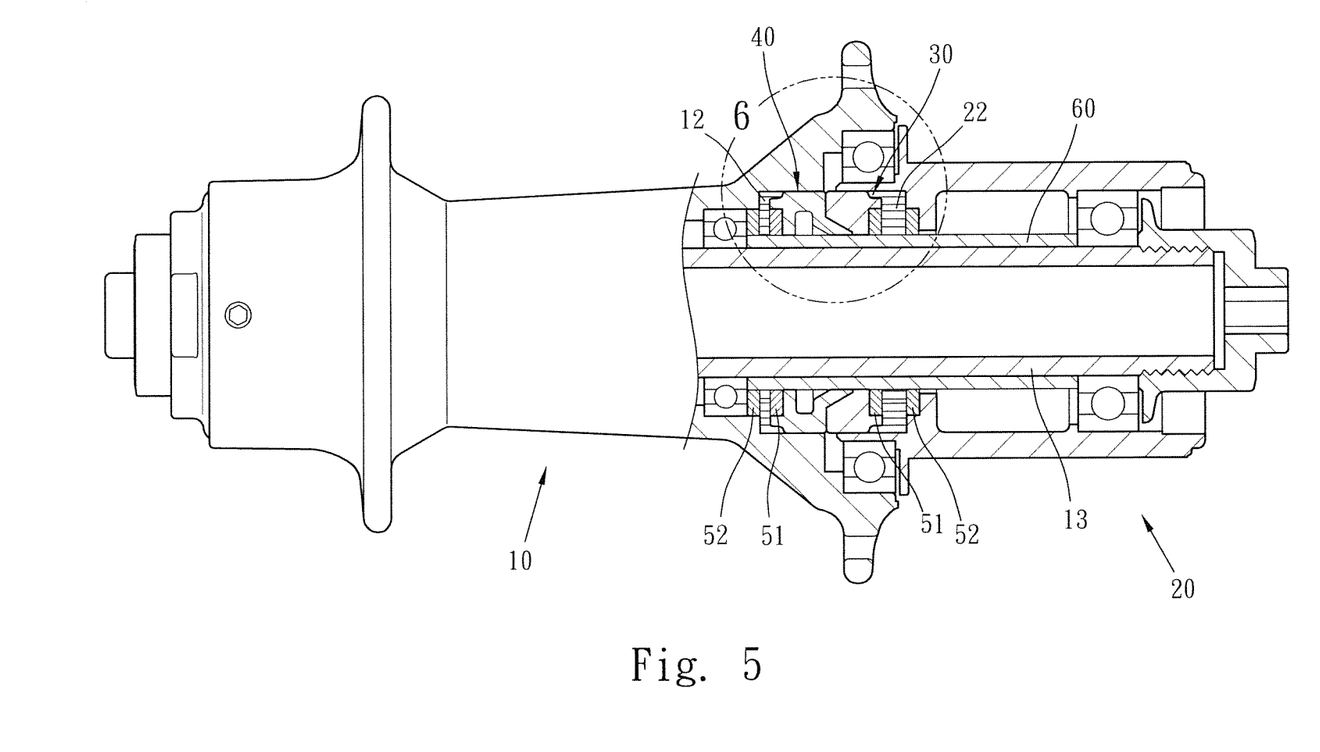
FIG. 5 shows the cross sectional view of the hub assembly of the present invention.

The hub 10 is a hollow hub and has a first hole 11 defined in one end thereof and a first slot 12 is defined in the inner periphery of the first hole 11. The first slot 12 is parallel to the axis of the hub 10 and an axle 13 is located in the first hole 11. The first slot 12 comprises multiple notches defined in the inner periphery of the first hole 11 in the hub 10.

The tubular portion 20 is a hollow tube and has a second hole 21 in one end thereof and a second slot 22 is defined in the inner periphery of the second hole 21. The second slot 22 is parallel to the axis of the tubular portion 20. The second slot 22 comprises multiple notches defined in the inner periphery of the second hole 21.

Figure 3:
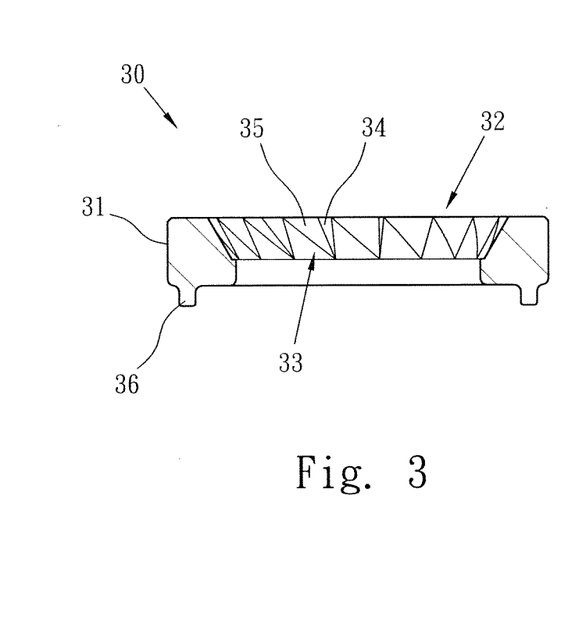
FIG. 3 shows the cross sectional view of the driving member.

The driving member 30 is an annular member and has multiple first teeth 31 defined in the outer periphery thereof. The first teeth 31 are located corresponding to the second slot 22. The driving member 30 has a cone-shaped first ratchet portion 32 formed axially thereon and the first ratchet portion 32 comprises multiple cone-shaped notches 33 or protrusions. In this embodiment, the first ratchet portion 32 comprises multiple cone-shaped notches 33. Each of the notches 33 in radial direction is composed of a first contact surface 34 and a second contact surface 35. Each of the first and second contact surfaces 34, 35 is a triangular surface. The first contact surface 34 is smaller than the second contact surface 35. The driving member 30 has a first stop 36 which extends axially from one side thereof which is located away from the first ratchet portion 32. In this embodiment, there are two first stops 36. The first teeth 31 are engaged with the second slot 22 and the driving member 30 is movable linearly in the second slot 22.

Figure 4:
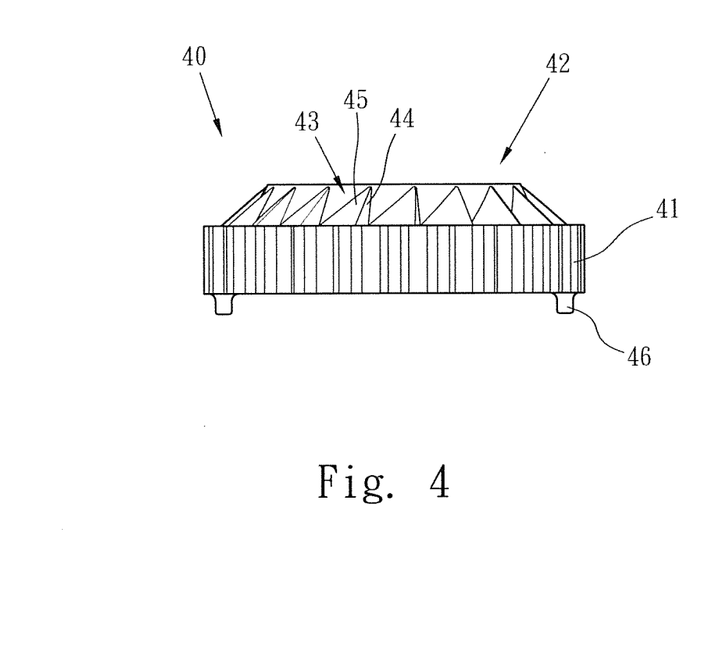
FIG. 4 shows the cross sectional view of the passive member.

The passive member 40 is an annular member and has multiple second teeth 41 defined in the outer periphery thereof. The second teeth 41 are located corresponding to the first slot 32. The passive member 40 has a cone-shaped second ratchet portion 42 formed axially thereon and the second ratchet portion 42 is engaged with the first ratchet portion 32. The second ratchet portion 42 has multiple cone-shaped protrusion 43 or notches which face the first ratchet portion 32. Each of the protrusions 43 in radial direction is composed of a third contact surface 44 and a fourth contact surface 45. Each of the third and fourth contact surfaces 44, 45 is a triangular surface. The third contact surface 44 is smaller than the fourth contact surface 45. The first and third contact surfaces 34, 44 are matched to each other, and the second and fourth contact surfaces 35, 45 are matched to each other. The passive member 40 has a second stop 46 which extends axially from one side thereof which is located away from the second ratchet portion 42. In this embodiment, there are two second stops 46. The second teeth 41 of the passive member 40 are engaged with the first slot 12 and the passive member 40 is movable linearly in the first slot 12.

The returning member unit has a returning member 50 located between the hub 10 and the passive member 40, and another returning member 50 located between the tubular portion 20 and the driving member 30. The returning member 50 is a magnet unit which has a first magnet 51 and a second magnet 52. The first magnet 51 is connected to the passive member 40 and located away from the second ratchet portion 42. The first magnet 51 is located between the two second stops 46. The second magnet 52 is located in the first hole 11 of the hub 10. Two respective facing ends of the first and second magnets 51, 52 have the same magnetic pole. The first magnet 51 is connected to the driving member 30 and located away from the first ratchet portion 32. The first magnet 51 is located between the two first stops 36. The second magnet 52 is located in the second hole 21 of the tubular portion 20. Two respective facing ends of the first and second magnets 51, 52 have the same magnetic pole. By the magnetically repulsion, the driving member 30 rotates toward the passive member 40.

The tube 60 has its inner diameter larger than the diameter of the axle 13, the inner diameter of the tube 60 is smaller than the diameter of the driving member 30, the passive member 40 and the returning member 50. The tube 60 is mounted to the axle 13 and located between the axle 13 and the driving member 30, and between the passive member 40 and the returning member 50. The tube 60 guides the linear movement of the driving member 30, the passive member 40 and the returning member 50.

Figure 6:
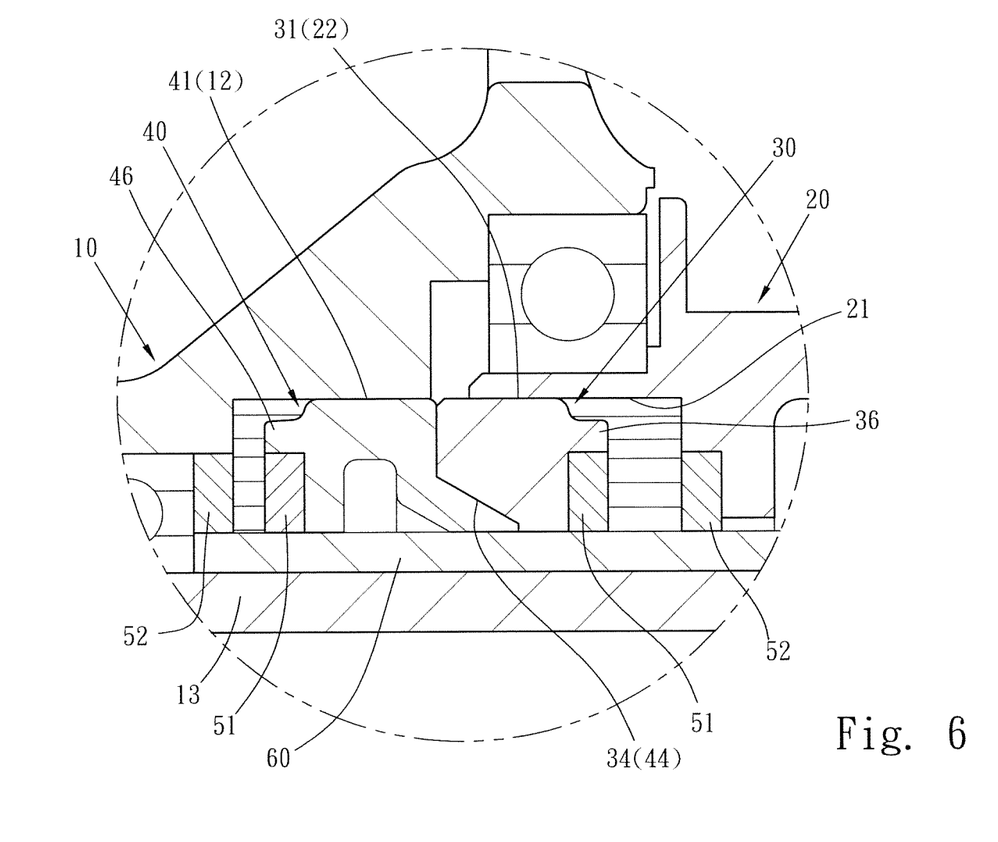
FIG. 6 is an enlarged cross sectional view of the hub assembly of the present invention.
Figure 7:
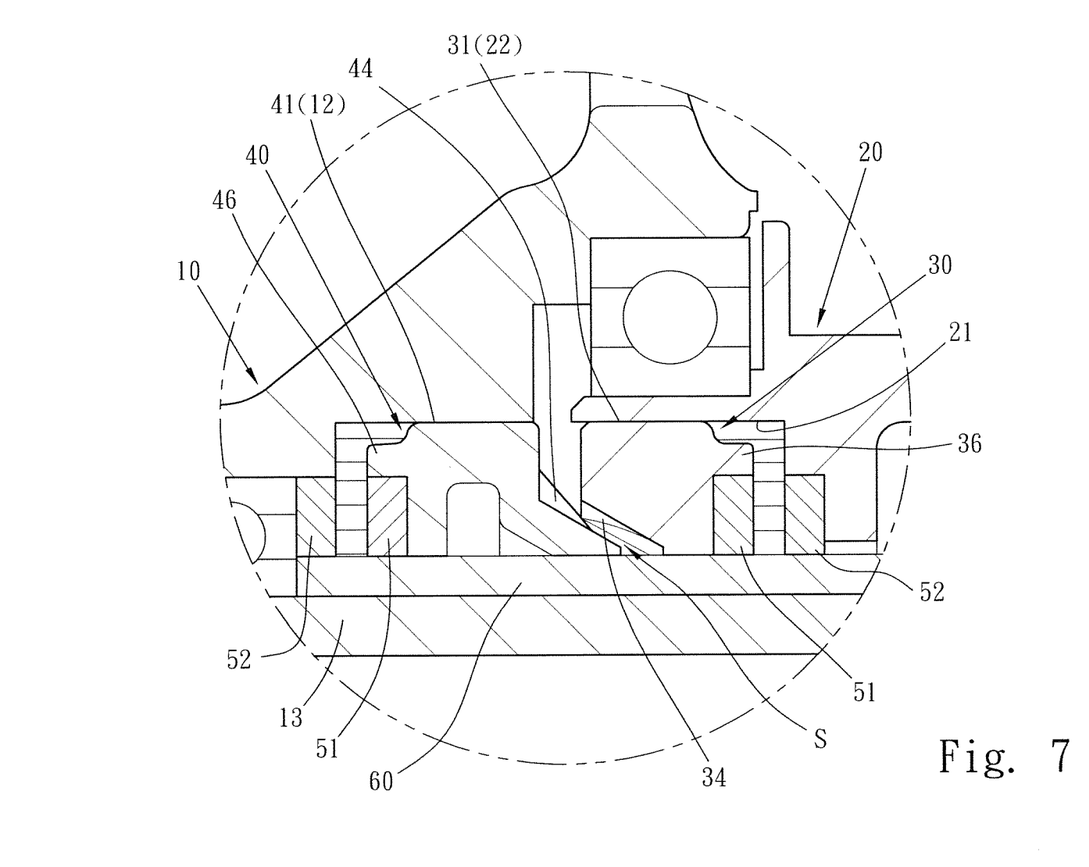
FIG. 7 is an enlarged cross sectional view to show the disengagement between the teeth of the driving member and the passive member of the hub assembly of the present invention.

When the tubular portion 20 rotates the driving member 30, the first contact surface 34 of the first ratchet portion 32 pushes the third contact surface 44 of the second ratchet portion 42 so as to rotate the hub 10. When the tubular portion 20 rotates in the opposite direction, the second contact surface 35 of the first ratchet portion 32 slides relative to the fourth contact surface 45 of the second ratchet portion 42, cooperated with the linear movements between the driving member 30 and the tubular portion 20, and between the passive member 40 and the hub 10, the driving member 30 is disengaged from the passive member 40 and a gap S is generated due to the linear movement.

As mentioned above, the driving member 30, the passive member 40 and the returning member 50 are moved linearly in the hub 10 and the tubular portion 20. By the engagement between the cone-shaped surfaces of the first and second ratchet portions 32, 42, the contact area between the cone-shaped surfaces composed of two triangular surfaces is reduced and which means less friction is occurred. The gap S between the driving member 30 and the passive member 40 allows the engagement and disengagement to be activated more quickly and the transmission is more sensitive.

When in use, as shown in FIGS. 5 and 6, the first ratchet portion 32 of the driving member 30 is engaged with the second ratchet portion 42 of the passive member 40, cooperated with the force of the returning members 50 and the rotation of the tubular portion 20, the first contact surface 34 and the third contact surface 44 are pushed toward each other to engage the first and second ratchet portions 32, 42. When rotation in the opposite direction as shown in FIG. 7, the second contact surface 35 of the first ratchet portion 32 slides relative to the fourth contact surface 45 of the second ratchet portion 42, the gap S is formed between the first and third contact surfaces 34, 44 due to the linear movements, the first and second ratchet portions 32, 42 are disengaged from each other. By the force of the returning members 50, the driving member 30 and the passive member 40 are returned to let the first and second ratchet portions 32, 42 to be engaged again.

Figure 8:
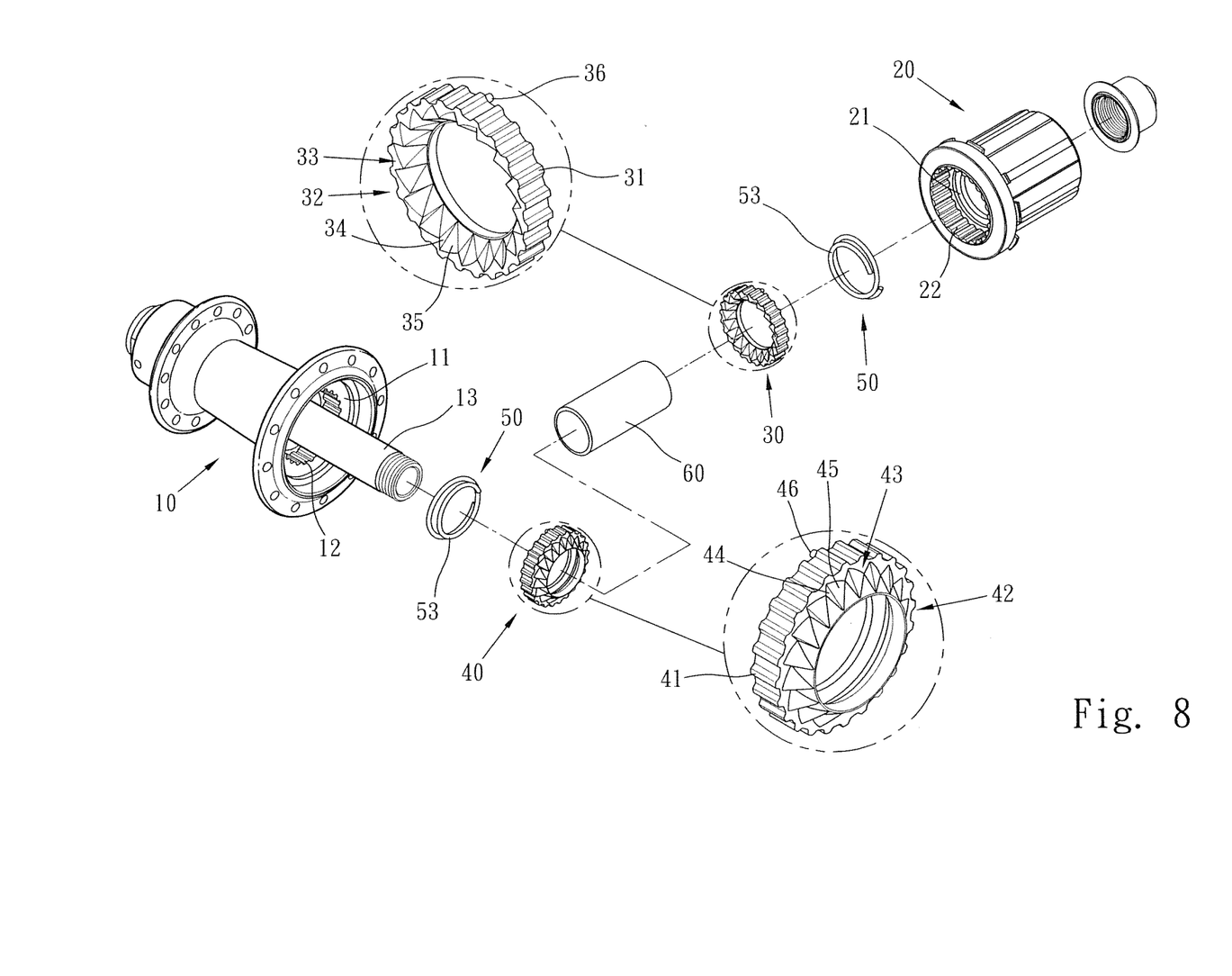
FIG. 8 is an exploded view to show the second embodiment of the hub assembly of the present invention.
Figure 9:
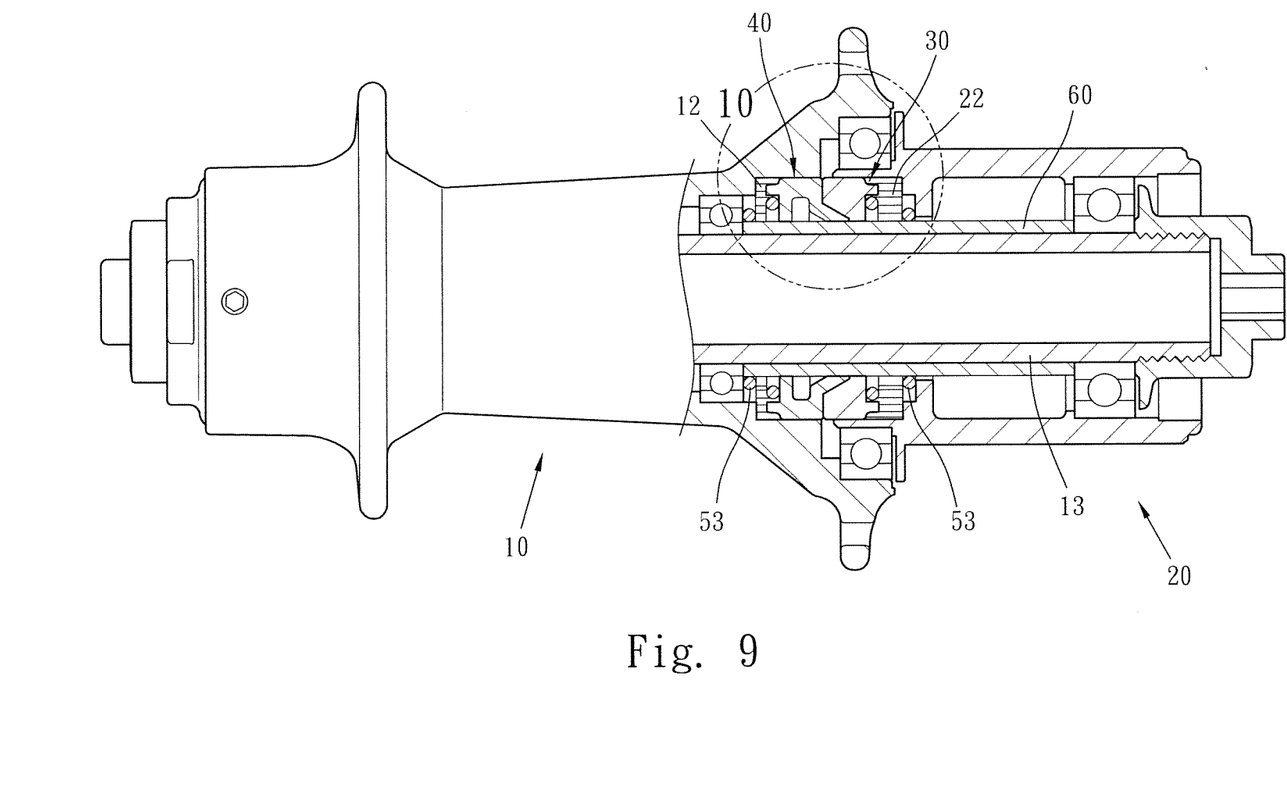
FIG. 9 shows the cross sectional view of the second embodiment of the hub assembly of the present invention.
Figure 10:
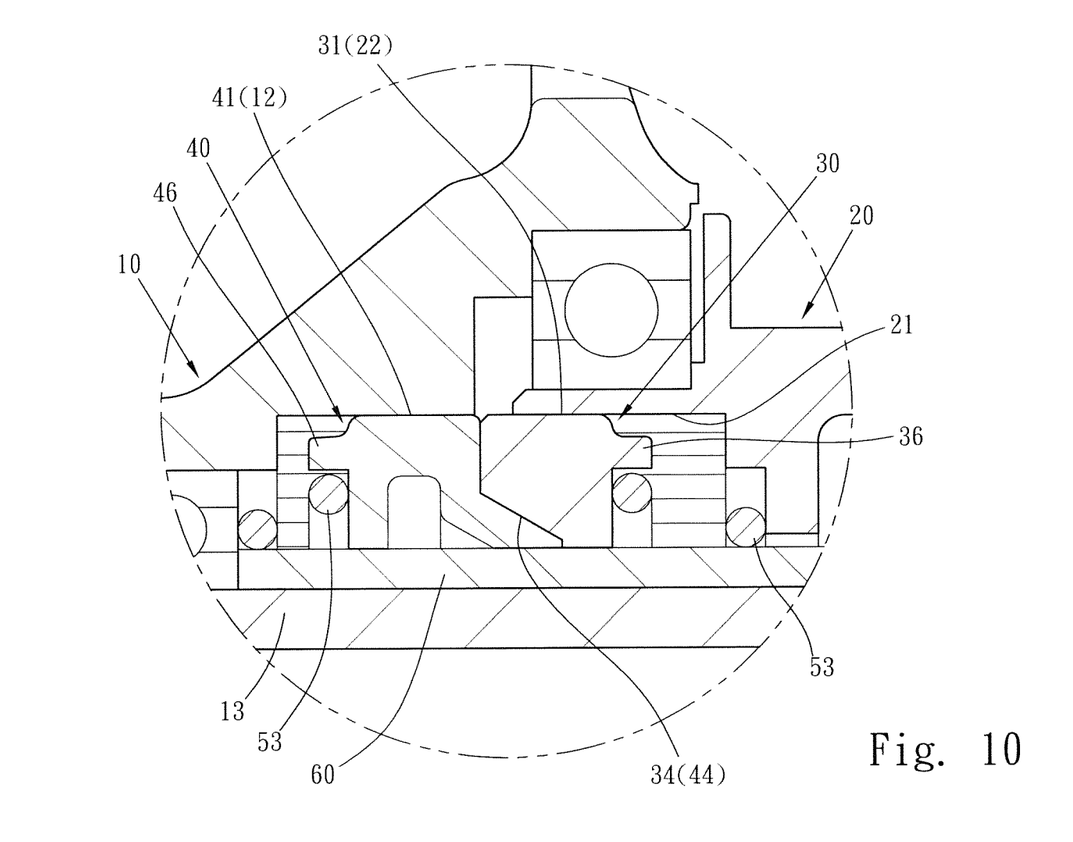
FIG. 10 is an enlarged cross sectional view to show the second embodiment of the hub assembly of the present invention.

As shown in FIGS. 8 to 10, the second embodiment of the present invention is shown and the returning members 50 are resilient members 53 such as springs. The resilient member 53 is located between the first hole 11 of the hub 10 and the passive member 40. One end of the resilient member 53 is located between the second stops 46 of the passive member 40. The other resilient member 53 is located between the tubular portion 20 and the driving member 30. One end of the resilient member 50 is located between the first stops 36 of the driving member 30. The first and second ratchet portions 32, 42 are engaged with each other and the resilient member 53 pushes the driving member 30 toward the passive member 40.

The first and second ratchet portions 32, 42 have notches 33 and protrusions 43, and each of the notches 33 and the protrusions 43 have cone-shaped portion that is composed by two inclined triangular surfaces so that the contact area is reduced and the friction is also reduced. When rotation in the opposite direction, a gap S is formed between the driving member 30 and the passive member 40 due to the linear movements, by the force of the returning members 50, the first and second ratchet portions 32, 42 can be engaged again quickly. The tube 60 is mounted to the axle 13 and located between the axle 13 and the driving member 30, and between the passive member 40 and the returning member 50. The tube 60 guides the linear movement of the driving member 30, the passive member 40 and the returning member 50.

The first and second stops 36, 46 of the driving member 30 and the passive member 40 position the returning members 50 to avoid the returning member 50 from tilting off when operation.

While we have shown and described the embodiment in accordance with the present invention, it should be clear to those skilled in the art that further embodiments may be made without departing from the scope of the present invention.

What is claimed is:

1. A hub assembly comprising:
   a hub having a first hole defined in one end thereof and a first slot defined in an inner periphery of the first hole, the first slot being parallel to an axis of the hub, an axle located in the first hole;
   a tubular portion having a second hole in one end thereof and a second slot defined in an inner periphery of the second hole, the second slot being parallel to an axis of the tubular portion;
   an annular driving member having multiple first teeth defined in an outer periphery thereof, the first teeth located corresponding to the second slot, the driving member having a cone-shaped first ratchet portion formed axially thereon, the cone-shaped first ratchet portion having a plurality of first and second triangular contact surfaces disposed in a conical arrangement about the axis of the tubular portion, the first and second triangular contact surfaces having different areas, the first teeth engaged with the second slot to maintain the driving member movable linearly in the second slot;
   an annular passive member having multiple second teeth defined in an outer periphery thereof, the second teeth located corresponding to the first slot, the passive member having a cone-shaped second ratchet portion formed axially thereon, the second ratchet portion defining a plurality of contact surfaces disposed in a complementary conical arrangement about the axis of the hub to conically engage the first ratchet portion in radially opposed manner, the second teeth of the passive member engaged with the first slot and the passive member movable linearly in the first slot, and
   a returning member unit having two returning members respectively located between the hub and the passive member, and between the tubular portion and the driving member.

2. The hub assembly as claimed in claim 1, wherein the first slot comprises multiple notches defined in the inner periphery of the first hole in the hub and the second slot comprises multiple notches defined in the inner periphery of the second hole in the hub.

3. The hub assembly as claimed in claim 1, wherein the first ratchet portion comprises multiple cone-shaped notches or protrusions, each of the notches or protrusions in radial direction comprises a first contact surface and a second contact surface, each of the first and second contact surfaces defining a triangular surface, the first contact surface being smaller than the second contact surface, the second ratchet portion having multiple cone-shaped protrusions or notches complementarily facing the first ratchet portion, each of the protrusions or notches in radial direction is comprising a third contact surface and a fourth contact surface, each of the third and fourth contact surfaces defining a triangular surface, the third contact surface being smaller than the fourth contact surface, the first and second ratchet portions being engaged with each other, the first and third contact surfaces being matched to each other, the second and fourth contact surfaces being matched to each other.

4. The hub assembly as claimed in claim 1, wherein the driving member has a first stop which extends axially from one side thereof which is located away from the first ratchet portion, the passive member has a second stop which extends axially from one side thereof which is located away from the second ratchet portion, the returning members are respectively positioned by the two respective stops.

5. The hub assembly as claimed in claim 1, wherein each of the returning members is a magnet unit including a first magnet and a second magnet, the first magnet being connected to the passive member and located away from the second ratchet portion, the second magnet being located in the first hole of the hub, two respective facing ends of the first and second magnets are the same magnetic pole, the first magnet being connected to the driving member and located away from the first ratchet portion, the second magnet being located in the second hole of the tubular portion, respective facing ends of the first and second magnets being the same in magnetic polarity.

6. The hub assembly as claimed in claim 1, wherein each of the returning members is a resilient member.

7. The hub assembly as claimed in claim 1, further comprising a tube having an inner diameter larger than a diameter of the axle, the inner diameter of the tube being smaller in diameter than the driving member, the passive member and the returning members, the tube being mounted to the axle and located between the axle and the driving member, and between the passive member and the returning members.

* * * * *